United States Patent
Bass

(10) Patent No.: US 8,197,225 B2
(45) Date of Patent: Jun. 12, 2012

(54) JET PUMP SLIP JOINT CLAMPS AND METHODS OF USING THE SAME

(75) Inventor: John R. Bass, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 152 days.

(21) Appl. No.: 12/837,625

(22) Filed: Jul. 16, 2010

(65) Prior Publication Data

US 2012/0012728 A1    Jan. 19, 2012

(51) Int. Cl.
*F04F 5/00* (2006.01)
*F04B 17/00* (2006.01)
*G21C 15/00* (2006.01)

(52) U.S. Cl. ......... 417/151; 417/363; 376/372; 285/316

(58) Field of Classification Search .................. 417/151, 417/363; 376/372; 248/560; 285/316
See application file for complete search history.

(56) References Cited

U.S. PATENT DOCUMENTS

| | | | |
|---|---|---|---|
| 5,100,182 A * | 3/1992 | Norkey et al. | 285/318 |
| 6,394,765 B1 | 5/2002 | Erbes et al. | |
| 6,438,192 B1 | 8/2002 | Erbes et al. | |
| 6,450,774 B1 | 9/2002 | Erbes et al. | |
| 6,490,331 B2 | 12/2002 | Erbes | |
| 6,587,535 B1 | 7/2003 | Erbes et al. | |
| 8,107,584 B2 * | 1/2012 | Defilippis et al. | 376/260 |
| 2008/0031741 A1 | 2/2008 | Torres | |
| 2011/0280360 A1 * | 11/2011 | Flanigan et al. | 376/372 |

* cited by examiner

*Primary Examiner* — Charles Freay
(74) *Attorney, Agent, or Firm* — Harness, Dickey & Pierce

(57) ABSTRACT

Slip joint clamps are installed against guide ears of diffusers at jet pump slip joints. Clamps may prevent vibration and/or movement in the slip joint while not being rigidly attached to the diffuser. Clamps include a compression flipper pressing against a guide ear of the diffuser in a substantially radial direction, a biasing member between the compression member and guide ear that presses the flipper against the guide ear, and supporting structures that hold the flipper and biasing member to the inlet mixer about the guide ear. Systems of slip joint clamps are installed against several guide ears of a single diffuser. Each clamp may radially stabilize the diffuser and inlet mixer while permitting upward relative movement of the inlet mixer. Placement and tensioning of clamps in such systems may be varied so as to prevent or reduce vibrations and/or oscillations between an inlet mixer and diffuser.

20 Claims, 5 Drawing Sheets

JET PUMP SLIP JOINT CLAMPS AND METHODS OF USING THE SAME

BACKGROUND

A reactor pressure vessel (RPV) in a light water reactor, such as a boiling water reactor (BWR), typically includes a core shroud surrounding the nuclear fuel core and supported by a shroud support structure. FIG. 1 is a partial sectional view, with parts cut-away, of a related-art RPV 20 for a BWR. RPV 20 has a generally cylindrical shape and is closed at one end by a bottom head (not shown) and at its other end by removable top head (not shown). A top guide (not shown) is spaced above a core plate 22 within RPV 20. A shroud 24 surrounds core plate 22 and is supported by a shroud support structure 26. An annulus 28 is formed between shroud 24 and sidewall 30 of RPV 20.

An inlet nozzle 32 extends through sidewall 30 of RPV 20 and is coupled to a jet pump assembly 34. The hollow tubular jet pumps in the shroud annulus provide the required reactor core water flow. Jet pump assembly 34 includes a riser pipe 38, a plurality of inlet mixers 42 that make up the upper portion of the jet pump and are connected to a plurality of riser pipes 38 by a plurality of transition assemblies 44, and a diffuser 46. Each inlet mixer 42 is laterally positioned and supported against two opposing rigid contacts within restrainer brackets that support inlet mixer 42 by attaching to adjacent jet pump riser pipe 38. Riser pipe 38 extends between and substantially parallel to shroud 24 and RPV sidewall 30. A slip joint 48 couples each inlet mixer 42 to a corresponding diffuser 46, which is the lower portion of the jet pump. Slip joint 48 between jet pump inlet mixer 42 and jet pump diffuser 46 has about 0.015 inch operating clearance to accommodate relative axial thermal expansion movement between the upper and lower parts of the jet pump, which results in leakage flow from the driving pressure inside the pump.

FIG. 2 is a partial side view, with parts cut away, of related-art slip joint 48. Inlet mixer 42 is generally cylindrical and includes an outer surface 50. Inlet mixer 42 is received in diffuser 46. Diffuser 46 includes an inner surface 52 positioned adjacent to inlet mixer outer surface 50. Operational clearance 54 is shown at an interface 56 between inlet mixer outer surface 50 and diffuser inner surface 52. A diffuser guide ear 45 projects outward from a top of diffuser 46 to provide proper alignment between diffuser 46 and inlet mixer 42. Several guide ears 45 may be positioned about a top perimeter edge of diffuser 46, for example, four guide ears 45, at 90 degree intervals.

Slip joint 48 may be stainless steel in inlet mixer outer surface 50 with a cobalt alloy hardfacing extending over interface 56. Diffuser inner surface 52 may also be stainless steel, with only localized areas of cobalt alloy hardfacing extending into interface 56.

SUMMARY

Example embodiments include slip joint clamps installed against guide ears of diffusers at jet pump slip joints. Example embodiment jet pump slip joint clamps may prevent vibration and/or movement in the slip joint while not being rigidly attached to the diffuser. Example embodiment clamps may include a compression flipper pressing against a guide ear of the diffuser in a substantially radial direction or otherwise and a biasing member, such as a spring, between the compression member and guide ear that presses the flipper against the guide ear. Example clamps may also include supporting structures that hold the flipper and biasing member to the inlet mixer about the guide ear.

Example embodiments further include systems of slip joint clamps installed against several guide ears of a single diffuser. Each clamp may radially stabilize the diffuser and inlet mixer while permitting upward relative movement of the inlet mixer. Placement and tensioning of clamps in example embodiment systems may be varied so as to prevent or reduce vibrations and/or oscillations between an inlet mixer and diffuser.

DETAILED DESCRIPTION

Figure 1:
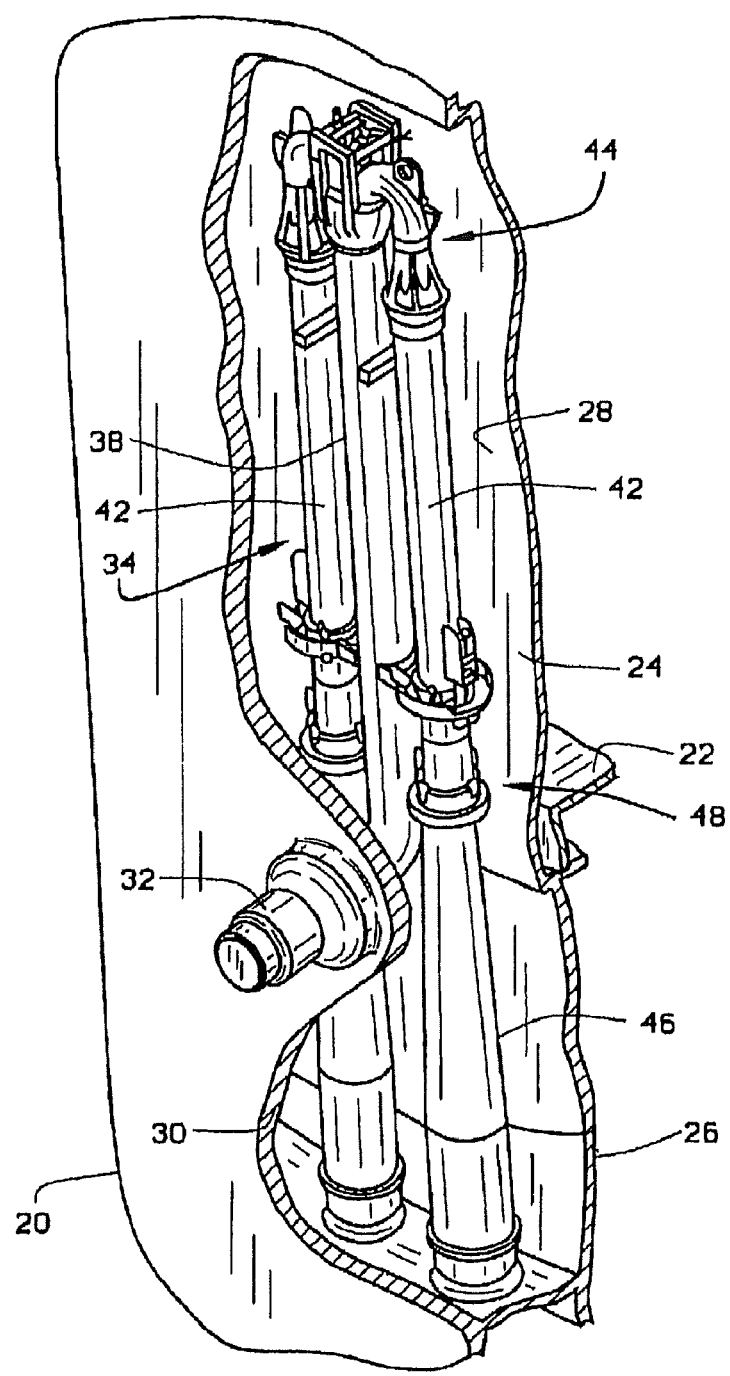
FIG. 1 is an illustration of a prior art Reactor Pressure Vessel with parts cut away to show a jet pump assembly.
Figure 2:
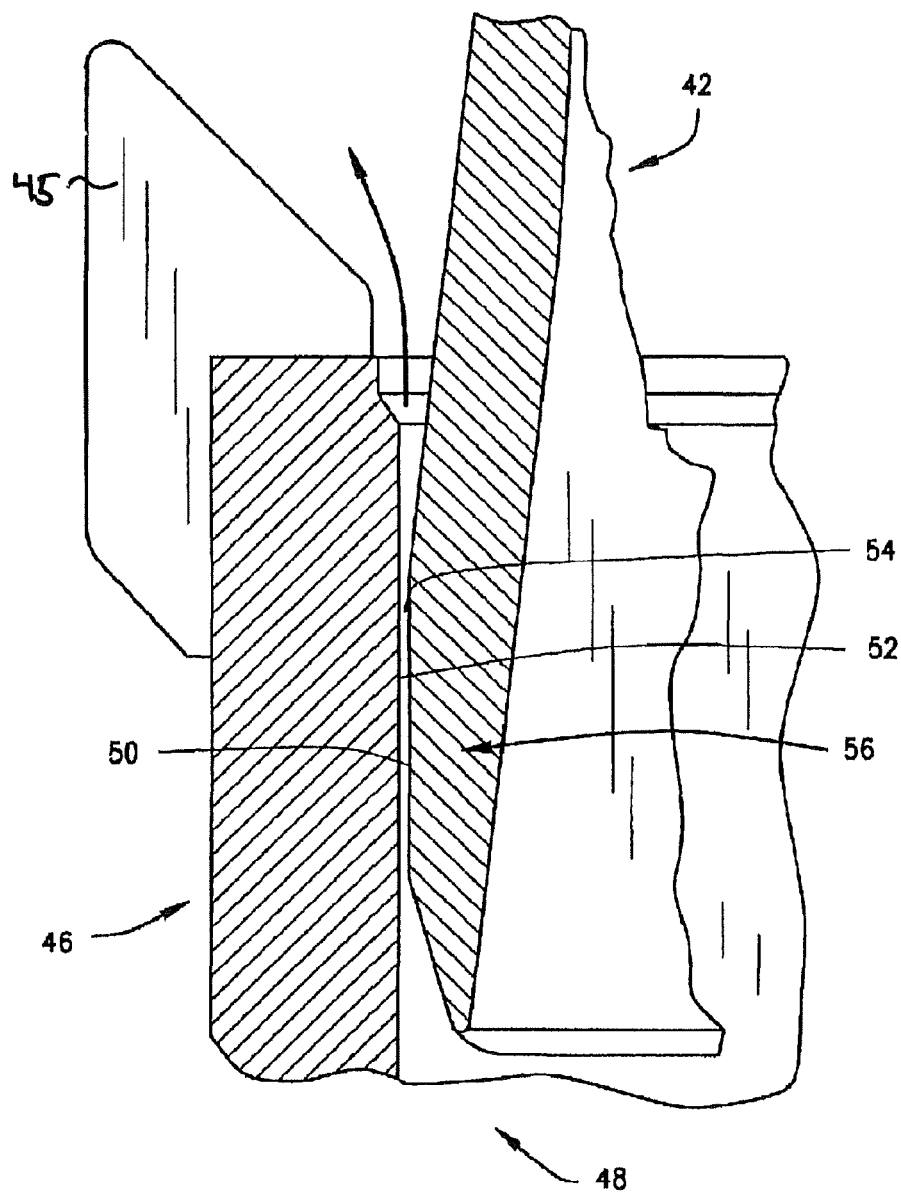
FIG. 2 is a detail illustration of a slip joint between an inlet mixer and diffuser of a prior art jet pump assembly.

Hereinafter, example embodiments will be described in detail with reference to the attached drawings. However, specific structural and functional details disclosed herein are merely representative for purposes of describing example embodiments. The example embodiments may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures or described in the specification. For example, two figures or steps shown in succession may in fact be executed substantially and concurrently or may sometimes be executed in the reverse order or repetitively, depending upon the functionality/acts involved.

Excessive leakage flow can cause oscillating motion in slip joints, which is a source of detrimental vibration excitation in the jet pump assembly. The slip joint leakage rate can increase due to single loop operation, increased core flow, or jet pump crud deposition. The resultant increased vibration levels and corresponding vibration loads on the piping and supports can cause jet pump component degradation, including jet pump wedge, set screw, and riser piping damage, from wear and fatigue caused by the vibration loads. High levels of flow induced vibration (FIV) are possible under some abnormal operational conditions having increased leakage rates.

Figure 3:
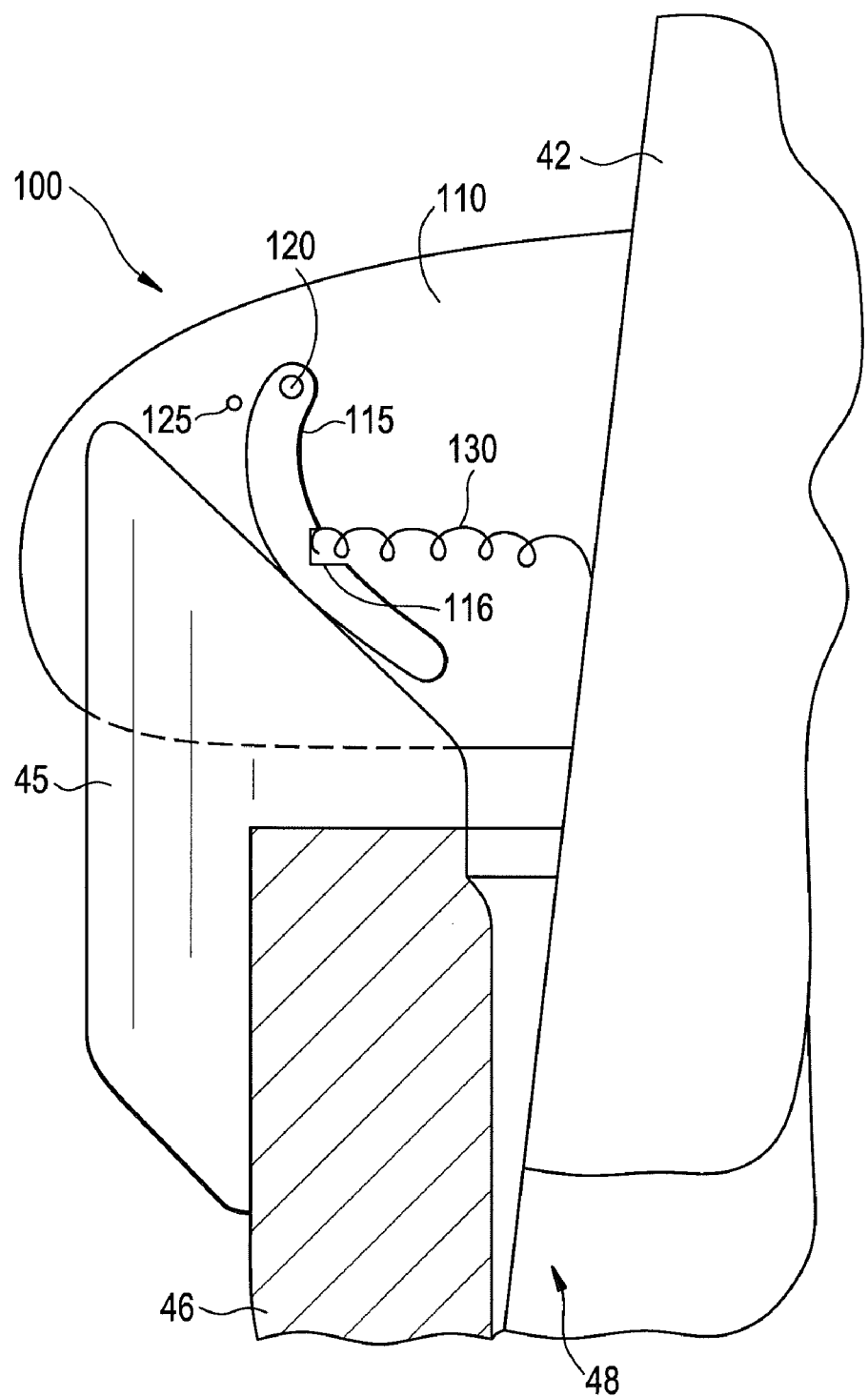
FIG. 3 is a profile view of an example embodiment slip joint clamp installed at a slip joint.

FIG. 3 is an illustration of an example embodiment slip joint clamp 100 shown installed in a related-art slip joint 48. As shown in FIG. 3, the example embodiment slip joint clamp includes a compression flipper 115 and biasing element 130. Compression flipper 115 is positioned and aligned against a guide ear 45 on a top outer perimeter of diffuser 46.

Biasing element 130 biases compression flipper 115 against guide ear 45. By biasing between guide ear 45 of diffuser 46 and inlet mixer 42, example embodiment slip joint clamp 100 may reduce or prevent vibration and/or oscillation between diffuser 46 and inlet mixer 42. Biasing element 130 may be any component capable of providing a force between inlet mixer 42 and compression flipper 115, including a single-direction bias or multi-direction damping force. For example, biasing element 130 may be a spring, elastic rod, transducer, etc., pushing between compression flipper 115 and inlet mixer 42. A spring constant or other biasing force of biasing element 130 may be chosen to minimize flow-induced or other vibration in slip joint 48. For example, biasing element 130 may be a spring having a spring constant chosen to destroy or not match a natural frequency of diffuser 46 and/or inlet mixer 42, based on the flow rates expected through slip joint 48, frequency testing of these components, etc. Biasing element 130 may be attached to only one of compression flipper 115 and inlet mixer 42, in order to permit some vertical relative movement, such as vertical thermal expansion, between these structures without changing a length of biasing element 130.

Compression flipper 115 is aligned with and is driven against guide ear 45. Compression flipper 115 may be rotatably coupled by a pivot pin 120 to a support 110 affixed to a surface of inlet mixer 42. For example, compression flipper 115 may be permitted to move and/or rotate only in a plane with guide ear 45 by pivot pin 120 fixing compression flipper 115 with respect to inlet mixer 42 except to permit rotation against guide ear 45 about pivot pin 120. In this way, compression flipper 115 and biasing element 130 may provide a substantially radial biasing force from a center of diffuser 48 and inlet mixer 42. While biasing element 130 is shown positioned between inlet mixer 42 and compression flipper 115, it is understood that biasing element 130 could also be a wound spring on pivot pin 120 or another structure and bias compression flipper 115 in a radial direction.

Compression flipper 115 may be shaped to provide a substantially even biasing force to guide ear 45 and/or damping force between diffuser 46 and inlet mixer 42. For example, compression flipper 115 may be curved to provide equal force as compression flipper 115 rotates counterclockwise and biasing element 130 elongates, such that as biasing element 130 pushes with less force, the force is more directly transmitted to guide ear 45 and guide ear 45 is pushed with substantially even force away from inlet mixer 42, regardless of a relative position between guide ear 45 and inlet mixer 42. Such curvature may also permit some relative vertical movement between diffuser 46 and inlet mixer 42 while maintaining a radial urging against guide ear 45. Compression flipper 115 may further include a divot 116 where biasing element 130 joins thereto, to provide a linear path for biasing element 130 between compression flipper 115 and inlet mixer 42 and/or protect a junction area between biasing element 130 and compression flipper 115 from damage due to flow or debris fretting.

Example embodiment clamp 100 may further include a stop pin 125 fixed to support 110. Stop pin 125 may be placed in a path of movement of compression flipper 115 so as to stop further movement of compression flipper 115. For example, if compression flipper 115 is not joined to guide ear 45, stop pin 125 may be positioned to prevent compression flipper 115 from biasing against guide ear 45 once compression flipper has reached a maximum desired extension. Or, for example, stop pin 125 may be positioned with pivot pin 120 to prevent compression flipper 115 from extending past a relaxed length of biasing element 130 or extending to a position where compression flipper may become caught against guide ear 45.

Compression flipper 115, biasing element 130, pivot pin 120, and/or stop pin 125 are directly and/or indirectly fixed with inlet mixer 42, such that vertical movement in inlet mixer 42 will result in each of these elements similarly moving. Example embodiment clamp 100 includes a support 110 as an integral part of or directly adjoining inlet mixer 42, to which pivot pin 120 and/or stop pin 125 are mated. For example, support 110 may be welded or fastened to inlet mixer 42. In this way, example embodiment slip joint clamps 100 may not require additional disassembly from other slip join components and may be removable together with inlet mixer 42 during inspection.

Figure 4:
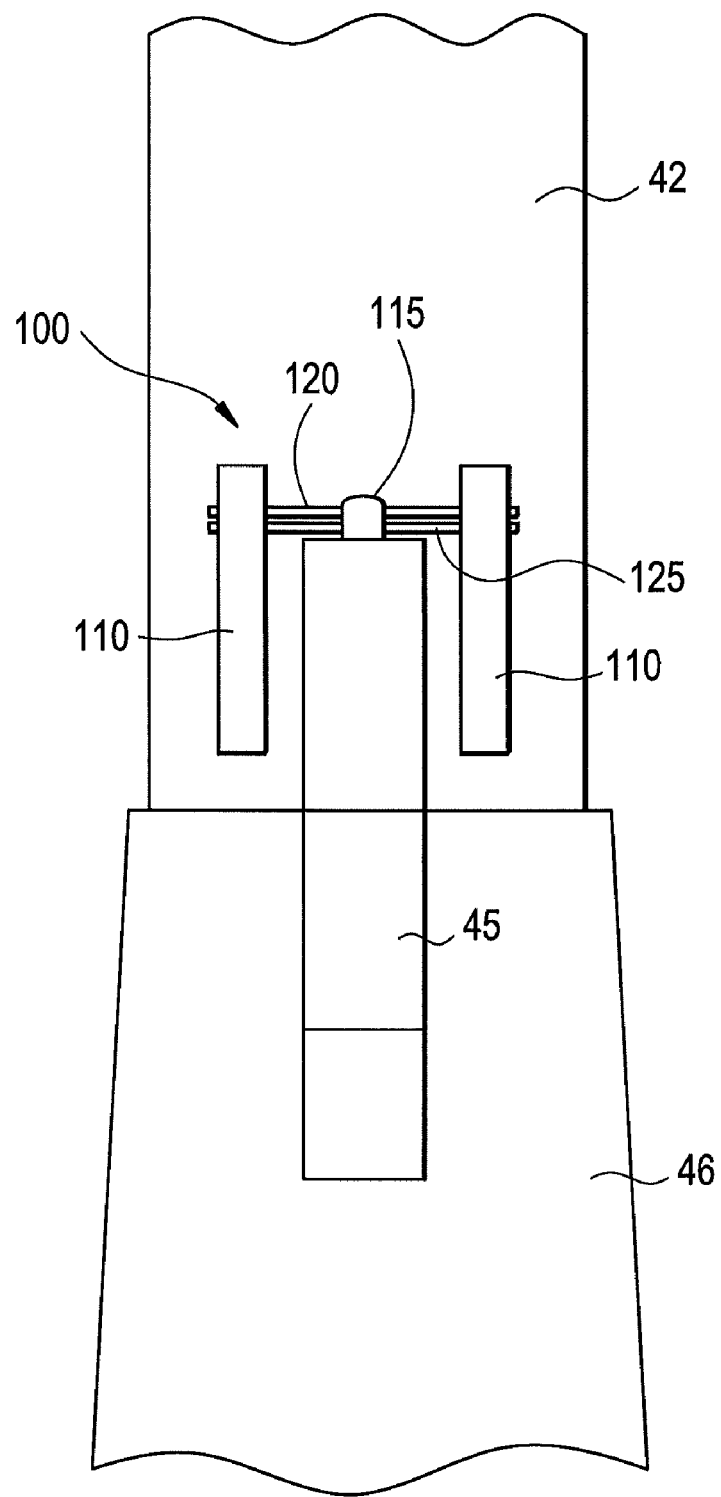
FIG. 4 is a top view of an example embodiment slip joint clamp installed at a slip joint.

Several alternate arrangements for supporting and aligning compression flipper 115 are possible. For example, as shown in FIG. 4, example embodiment clamp 100 may include two supports 110 positioned about guide ear 45, with pivot pin 120 and stop pin 125 fixed therebetween. In this way, compression flipper 115 may move transversely along pivot pin 120 while remaining in contact with guide ear 45 and not being permitted to slip off guide ear 45 because of supports 110 at respective sides of guide ear 45. Alternatively, as shown in FIG. 3, a single support 110 may be used, and compression flipper 115 may be fixed to pivot pin 120, which rotates where pivot pin 120 joins support 110, so as to permit compression flipper 115 to rotate against guide ear 45.

Similarly, although only one biasing element 130 is shown in FIGS. 3 and 4, example embodiment clamps may include several biasing elements driving compression flipper 115 against guide ear 45 and/or providing a damping force between a compression flipper 115 affixed to guide ear 45. Further, pivot pin 120 may connect at any point on compression flipper 115, permitting rotation against guide ear 45 from different rotational directions. One or more stop pins 125 may be placed at any position about compression flipper 115 in order to restrict compression flipper 115 to a desired range of motion, based on where and how compression flipper 115 connects to biasing element 130 and/or indirectly connects to inlet mixer 42.

The various components of example embodiment clamp 100 are fabricated of materials that maintain their material properties when exposed to an operating commercial nuclear reactor environment, including high temperatures, volatile chemistries, and radiation encountered therein. For example, zirconium alloys, nickel alloys, aluminum alloys, stainless steel, etc. may be used in example embodiment clamp 100. Materials may be chosen to reduce fouling and/or electric potential between components of example embodiment slip joint clamps and inlet mixer 42 and/or guide ear 45. For example, if inlet mixer 42 is stainless steel, example embodiment clamp may be fabricated of stainless steel.

Figure 5:
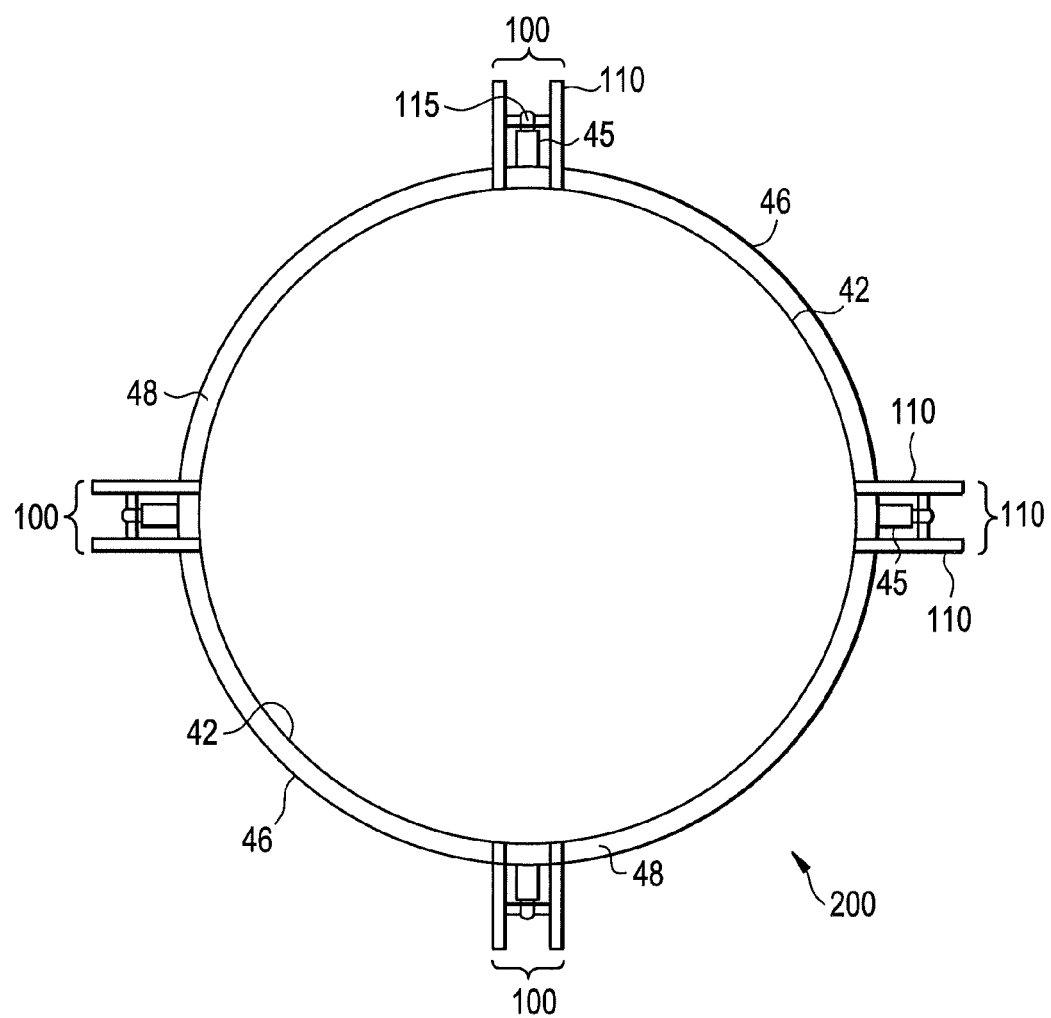
FIG. 5 is a top view of an example embodiment slip joint clamp system installed at a slip joint.

FIG. 5 is a top view of an example embodiment slip joint clamp system 200 installed at a slip joint 48. As shown in FIG. 5, example embodiment system includes multiple example embodiment slip joint clamps 100, each positioned at a guide ear 45 of diffuser 46. Although related art diffusers typically include four guide ears 45 and a clamp 100 is shown at each guide ear, it is understood that other numbers of guide ears and clamps 100 may be used in example embodiment systems. Although slip joint clamps 100 are shown with two supports 110 and other structures as in FIG. 4, it is understood that each clamp 100 may be varied and different from each other clamp 100, as discussed above.

Each example embodiment clamp 100 biases diffuser 46 apart from inlet mixer 42 via guide ears 45. The pressure from clamps 100 causes diffuser 46 and inlet mixer 42 to be held in substantially fixed relative position by the opposing, multiple forces provided by the multiple clamps 100 at different positions. As discussed above, an amount, variance, and direction of force provided by example embodiment clamps 100 may be changed by changing biasing member 130 characteristics, compression flipper 115 shape, pivot pin 120 number or location, etc. In this way, a total amount of stabilizing force applied by example embodiment system 200 may be changed based on desired slip joint 48 operating conditions. For example, an amount of force supplied by example embodiment system 200 may be set to best counteract a known or probable oscillation between diffuser 46 and inlet mixer 42. Similarly, damaging vibration known or expected in a particular dimension may be counteracted by placing opposite example embodiment clamps 100 in that dimension or configuring a resultant stabilizing force from example embodiment clamps 100 to be of a sufficient degree in that dimension.

Example embodiment system 200 includes example embodiment clamps 100 that are integral with inlet mixer 42 may require no additional disassembly when removing inlet mixer 42 from diffuser 46 or inspecting slip joint 48. Additionally, because system 200 is fixed with inlet mixer 42, any vertical or other translation in inlet mixer 42, such as may be caused by thermal expansion, results in example embodiment system 200 freely moving as well.

Example embodiments thus being described, it will be appreciated by one skilled in the art that example embodiments may be varied through routine experimentation and without further inventive activity. Variations are not to be regarded as departure from the spirit and scope of the example embodiments, and all such modifications as would be obvious to one skilled in the art are intended to be included within the scope of the following claims.

What is claimed is:

1. A jet pump slip joint clamp comprising:
   a compression flipper configured to bias against a guide ear of a diffuser in the jet pump;
   a biasing member configured to bias the compression flipper against the guide ear from an inlet mixer in the jet pump; and
   a support structure coupled to the inlet mixer and rotatably supporting the compression flipper.

2. The jet pump slip joint clamp of claim 1, wherein the support structure includes,
   at least one support configured to be rigidly attached to the inlet mixer, and
   a pivot pin joined to the support, the compression flipper rotatably coupled to the pivot pin.

3. The jet pump slip joint clamp of claim 2, wherein the compression flipper is rotatable about the pivot pin, and wherein the biasing member is configured to bias the compression flipper in a plane of the rotation about the pivot pin.

4. The jet pump slip joint clamp of claim 1, further comprising:
   a stop pin connected to the support structure, the stop pin positioned about the compression flipper to prevent movement of the compression flipper beyond the stop pin.

5. The jet pump slip joint clamp of claim 1, wherein the biasing member is one of a spring and an elastic rod.

6. The jet pump slip joint clamp of claim 5, wherein the compression flipper includes a divot and wherein the biasing member joins to the compression flipper in the divot.

7. The jet pump slip joint clamp of claim 6, wherein the biasing member is rigidly attached to the compression flipper and not rigidly attached to the inlet mixer.

8. The jet pump slip joint clamp of claim 1, wherein the compression flipper has a curved shape such that the compression flipper is configured to bias against the guide ear at different positions with equal force.

9. A jet pump slip joint clamp, comprising:
   two supports rigidly affixed to an inlet mixer of the jet pump;
   a compression flipper rotatably coupled to the two supports; and
   a biasing member coupled to the compression flipper and biasing the compression flipper away from the inlet mixer of the jet pump.

10. The jet pump slip joint clamp of claim 9, wherein the two supports are affixed to the inlet mixer so as to extend on respective sides of a guide ear of a diffuser of the jet pump and so as to align the compression flipper with the guide ear.

11. The jet pump slip joint clamp of claim 10, wherein the biasing member is not affixed to the inlet mixer and biases the compression flipper against the guide ear, and wherein the compression flipper is joined to the two supports so as to rotate only about an axis perpendicular to the direction in which the two supports extend on the respective sides of the guide ear.

12. The jet pump slip joint clamp of claim 11, wherein the compression flipper has a convex surface in a direction against the guide ear.

13. The jet pump slip joint clamp of claim 12, further comprising:
   a stop pin connected between the two supports in a path of the rotation of the compression flipper.

14. A stabilizing system for reducing lateral movement or vibration between a diffuser and an inlet mixer of a jet pump, the system comprising:
   a plurality of slip joint clamps affixed to the inlet mixer and biasing against the diffuser to bias the diffuser of the jet pump apart from the inlet mixer.

15. The system of claim 14, wherein each slip joint clamp includes,
   at least one support rigidly joined to and extending radially outward from a surface of the inlet mixer at a position of a guide ear of the diffuser,
   a compression flipper attached to the at least one support and configured to bias against the guide ear, and
   a biasing member configured to bias the compression flipper against the guide ear from the inlet mixer in the jet pump.

16. The system of claim 15, wherein each slip joint clamp further includes a pivot pin joined to the support, the compression flipper rotatably coupled to the pivot pin.

17. The system of claim 16, wherein each slip joint clamp further includes a stop pin connected to the support in a path of the rotation of the compression flipper about the pivot pin.

18. The system of claim 14, wherein each of the clamps applies a biasing force only in a radial direction to the diffuser.

19. The system of claim 14, wherein each of the slip joint clamps is opposite another slip joint clamp about a central longitudinal axis of the jet pump.

20. The system of claim 14, wherein there are only four slip joint clamps and only four guide ears.

* * * * *